(12) United States Patent
Kojima et al.

(10) Patent No.: US 11,933,234 B2
(45) Date of Patent: Mar. 19, 2024

(54) SUPERCHARGING PRESSURE CONTROL METHOD AND SUPERCHARGING PRESSURE CONTROL DEVICE FOR INTERNAL COMBUSTION ENGINE

(71) Applicant: NISSAN MOTOR CO., LTD., Yokohama (JP)

(72) Inventors: Akira Kojima, Kanagawa (JP); Mitsuhiko Kubota, Kanagawa (JP); Daisuke Imai, Kanagawa (JP); Masashi Morikawa, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 18/017,923

(22) PCT Filed: Jul. 28, 2020

(86) PCT No.: PCT/JP2020/028792
§ 371 (c)(1),
(2) Date: Jan. 25, 2023

(87) PCT Pub. No.: WO2022/024203
PCT Pub. Date: Feb. 3, 2022

(65) Prior Publication Data
US 2023/0272754 A1    Aug. 31, 2023

(51) Int. Cl.
*F02D 41/00*    (2006.01)
*F02B 37/18*    (2006.01)

(52) U.S. Cl.
CPC ........ *F02D 41/0007* (2013.01); *F02B 37/183* (2013.01); *F02D 2200/0406* (2013.01);
(Continued)

(58) Field of Classification Search
CPC ......... F02D 41/0007; F02D 2200/0406; F02D 2200/0414; F02D 2200/101;
(Continued)

(56) References Cited

U.S. PATENT DOCUMENTS 10,197,003 B2 *  2/2019  Takayanagi ............. F02B 37/18
10,563,599 B2    2/2020  Hosoya et al.
(Continued)

FOREIGN PATENT DOCUMENTS

JP    2005-146906 A    6/2005
JP    2015-108329 A    6/2015
JP    2018-076833 A    5/2018

*Primary Examiner* — Brandon D Lee
(74) *Attorney, Agent, or Firm* — Foley & Lardner LLP

(57) ABSTRACT

An engine is provided with a turbo charger including a wastegate valve. A first setpoint of opening of the wastegate valve is set in accordance with a target boost pressure. While a difference between the target boost pressure and a real boost pressure is large, the opening is controlled to a second setpoint, wherein the second setpoint is smaller than the first setpoint. While the opening is controlled to the second setpoint, it is determined whether a condition for limitation is satisfied in which an intake air quantity is above an intake air quantity criterion and an engine rotation speed is above an engine rotation speed criterion. When the condition is satisfied, the opening is controlled in a direction to increase from the second setpoint. The engine rotation speed criterion decreases as the intake air quantity increases. The intake air quantity criterion decreases as the engine rotation speed increases.

9 Claims, 7 Drawing Sheets

(52) U.S. Cl.
CPC ............... *F02D 2200/0414* (2013.01); *F02D 2200/101* (2013.01); *F02D 2200/703* (2013.01)

(58) Field of Classification Search
CPC .... F02D 2200/703; F02D 41/10; F02D 41/18; F02B 37/183; F02B 37/18; Y02T 10/12
See application file for complete search history.

(56) References Cited

U.S. PATENT DOCUMENTS

| | | |
|---|---|---|
| 2016/0265468 A1 | 9/2016 | Takayanagi et al. |
| 2018/0128193 A1 | 5/2018 | Hosoya et al. |

\* cited by examiner

SUPERCHARGING PRESSURE CONTROL METHOD AND SUPERCHARGING PRESSURE CONTROL DEVICE FOR INTERNAL COMBUSTION ENGINE

TECHNICAL FIELD

The present invention relates to a boost pressure (supercharging pressure) control for an internal combustion engine provided with a turbocharger, and particularly to a boost pressure control with an enhanced response of a boost pressure in which rotation speed of the turbocharger is prevented from excessively increasing in response to a request of acceleration.

BACKGROUND ART

A typical turbocharger, which supercharges an internal combustion engine by using exhaust energy, includes a wastegate valve for causing a part of exhaust gas to bypass a turbine. In this internal combustion engine, a boost pressure control can be performed by controlling the opening of the wastegate valve.

For example, for a state of rapid acceleration in which an accelerator pedal opening is increased stepwise, it is desirable to quickly raise a boost pressure. A patent document 1 discloses that for a state of rapid acceleration in which an operating condition changes stepwise from a non-supercharging region to a supercharging region, a wastegate valve is fully closed temporarily, and then the opening of the wastegate valve is controlled in accordance with a target torque.

However, when the opening of the wastegate valve is excessively reduced temporarily in order to increase acceleration responsiveness in that way, the rotation speed of a turbocharger may excessively increase beyond an allowable rotation speed before the boost pressure reaches a value corresponding to the target torque.

In view of the foregoing, it is an object of the present invention to quickly increase a boost pressure while preventing the rotation speed of a turbocharger from excessively increasing in response to a request of acceleration in an internal combustion engine including the turbocharger.

PRIOR ART DOCUMENT(S)

Patent Document(s)

Patent Document 1: Japanese Patent Application Publication No. 2018-76833

SUMMARY OF INVENTION

According to the present invention, a boost pressure control for an internal combustion engine includes: setting a target boost pressure; setting a first setpoint of opening of a wastegate valve in accordance with the target boost pressure; while a difference between the target boost pressure and a real boost pressure is larger than a predetermined value, controlling the opening of the wastegate valve to a second setpoint, wherein the second setpoint is smaller than the first setpoint; while controlling the opening of the wastegate valve to the second setpoint, determining whether or not a condition for limitation is satisfied in which an intake air quantity is greater than or equal to an intake air quantity criterion; and in response to a determination that the condition for limitation is satisfied, controlling the opening of the wastegate valve in a direction to increase from the second setpoint.

Accordingly, in response to a request of rapid acceleration, the opening of the wastegate valve is controlled to the second setpoint smaller than the first setpoint in order to enhance the response of the boost pressure. This causes the boost pressure to rise quickly. If the condition for limitation, which is determined based on the intake air quantity, is satisfied when the boost pressure is rising, the opening of the wastegate valve is limited to a relatively large setpoint. This serves to prevent the rotation speed of a turbocharger from exceeding an allowable rotation speed.

Therefore, it is possible to achieve compatibility between improvement of the response of the boost pressure and prevention of the rotation speed of the turbocharger from excessively increasing.

MODE(S) FOR CARRYING OUT INVENTION

The following describes an embodiment of the present invention in detail with reference to the drawings.

Figure 1:
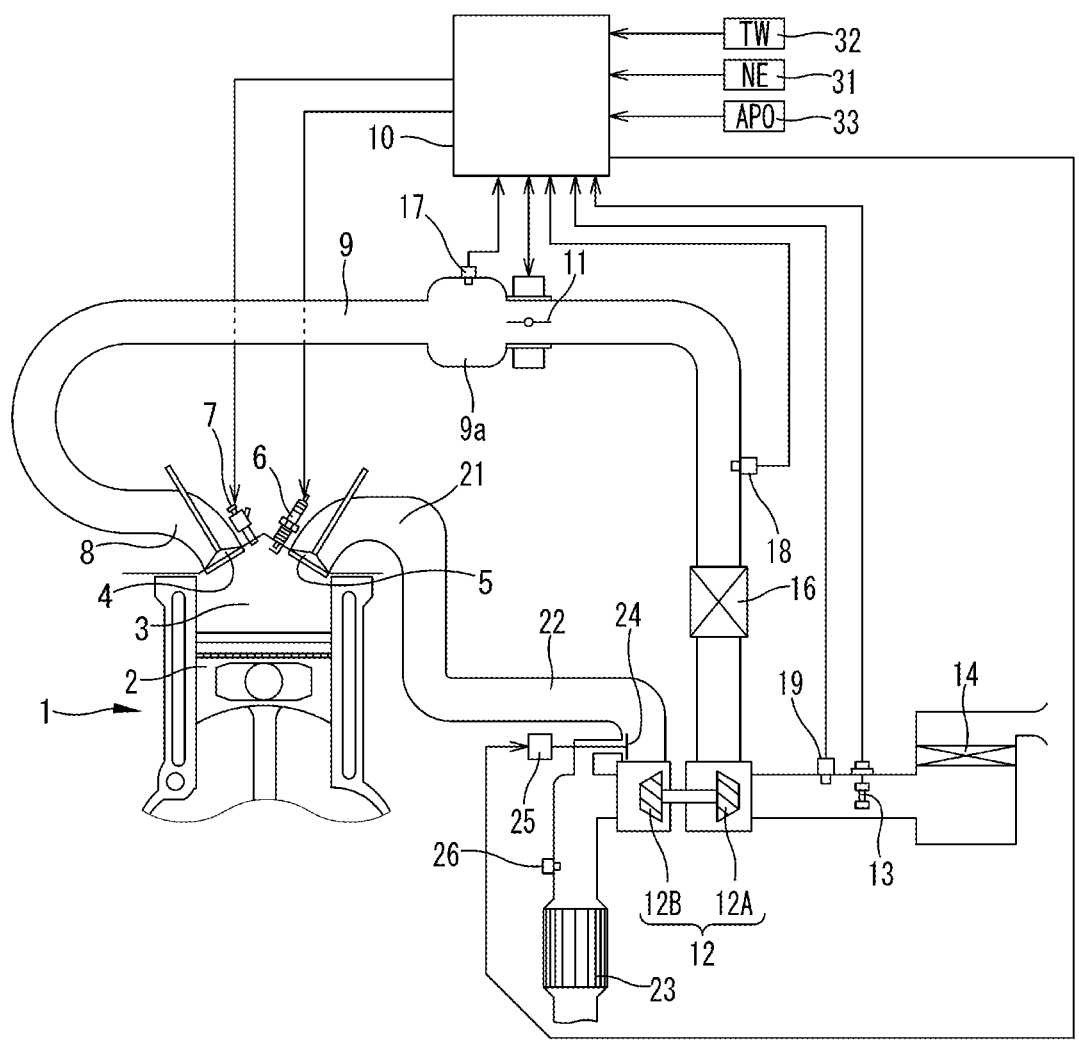
FIG. 1 is an explanatory diagram showing a system configuration of a supercharged internal combustion engine according to the present invention.

FIG. 1 is an explanatory diagram showing a schematic configuration of a supercharged internal combustion engine 1 for a vehicle to which a control according to the embodiment of the present invention is applied. In this example, the internal combustion engine 1 is a four stroke cycle spark ignition internal combustion engine using gasoline as fuel. A pair of intake valves 4, a pair of exhaust valves 5, an ignition plug 6, and a fuel injection valve 7 are arranged at a ceiling wall face of a combustion chamber 3 formed by a piston 2. The ignition plug 6 and the fuel injection valve 7 are disposed at a central portion of the ceiling wall face surrounded by the intake valves 4 and the exhaust valves 5.

The fuel injection valve 7 is an electromagnetic or piezoelectric injection valve structured to be opened by application of a drive pulse signal, to inject a quantity of fuel into a cylinder, wherein the quantity is substantially proportional to a pulse width of the drive pulse signal. In the present invention, the engine may be configured as a port injection type engine that injects fuel into an intake port 8 upstream of the intake valves 4.

A throttle valve 11 is disposed upstream of a collector section 9a of an intake passage 9 connected to the intake port 8. The throttle valve 11 is an electronically controlled throttle valve whose opening is controlled by a control signal from an engine controller 10. Upstream of the throttle valve 11, a compressor 12A of a turbocharger 12 is disposed. Upstream of the compressor 12A, an air flow meter 13, which senses an intake air quantity, and an air cleaner 14 are disposed. Between the compressor 12A and the throttle valve 11, an intercooler 16 is provided. An intake pressure sensor 17 is disposed at the collector portion 9a for sensing an intake pressure. Between the intercooler 16 and the throttle valve 11, a boost pressure sensor 18 is disposed for sensing an outlet pressure (namely, boost pressure) of the compressor 12A. Furthermore, upstream of the compressor 12A, a temperature and pressure sensor 19 is disposed for sensing an atmospheric temperature and an atmospheric pressure.

On the other hand, a turbine 12B of the turbocharger 12 is disposed in an exhaust passage 22 connected to an exhaust port 21 that is opened and closed by the exhaust valves 5. Downstream of the turbine 12B, a catalyst 23 is disposed, wherein the catalyst 23 is a three-way catalyst. For boost pressure control, a wastegate valve 24 is provided at an inlet side of the turbine 12B for guiding a part of the exhaust gas to bypass the turbine 12B. The wastegate valve 24 is of an electronically controlled type, wherein the opening of the wastegate valve 24 is controlled by an electric actuator 25.

On an inlet side of the catalyst 23, an air fuel ratio sensor 26 is provided for detecting a so-called exhaust air fuel ratio. The catalyst 23 is shown as one catalyst, but is generally composed of a precatalyst located in an engine room of a vehicle and a main catalyst located under a vehicle floor.

The engine controller 10 is configured to control the opening of the throttle valve 11, and also a fuel injection quantity and injection timing by the fuel injection valve 7, an ignition timing by the ignition plug 6, and others. The engine controller 10 also performs an air fuel ratio control using the air fuel ratio sensor 26.

The engine controller 10 further controls the opening of the wastegate valve 24, to control the boost pressure and thereby control the torque of the internal combustion engine 1, as described below. Basically, in a non-supercharging region in which a required torque is relatively small, the torque of the internal combustion engine 1 is controlled by controlling the opening of the throttle valve 11, and in a supercharging region in which the required torque is relatively large and the throttle valve 11 is fully opened, the torque of the internal combustion engine 1 is controlled by controlling the opening of the wastegate valve 24.

The engine controller 10 receives input of sensing signals from the air flow meter 13, the intake pressure sensor 17, the boost pressure sensor 18, the temperature and pressure sensor 19, and the air fuel ratio sensor 26, and also from a crank angle sensor 31 for sensing an engine rotation speed, a water temperature sensor 32 for sensing a cooling water temperature, an accelerator opening sensor 33 for sensing an accelerator opening according to depression of an accelerator pedal by a driver, and others.

Figure 2:
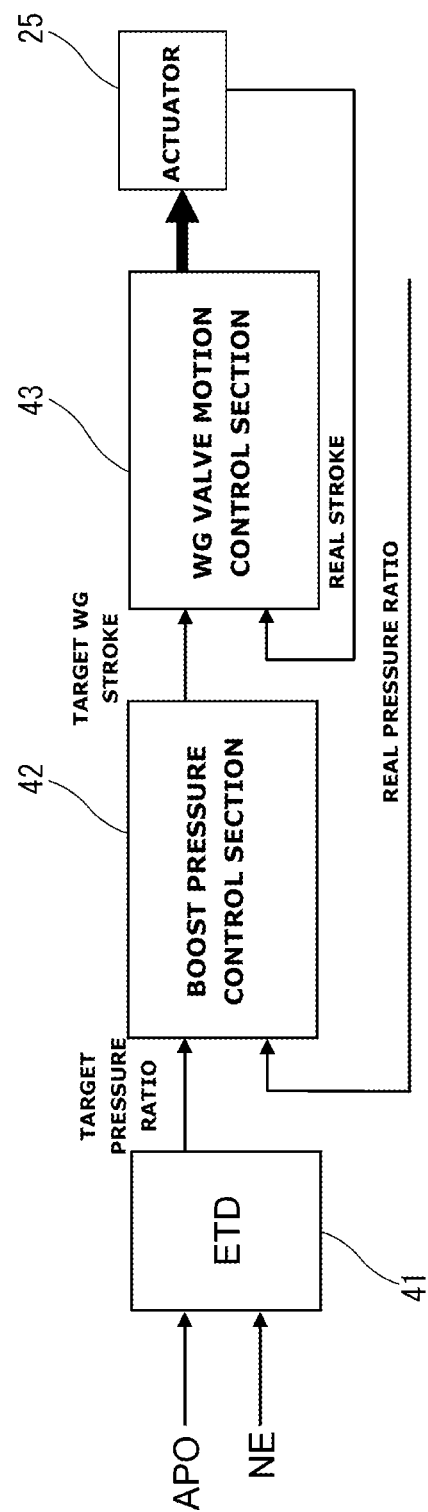
FIG. 2 is a block diagram showing an overall configuration of a control system of a wastegate valve.
Figure 3:
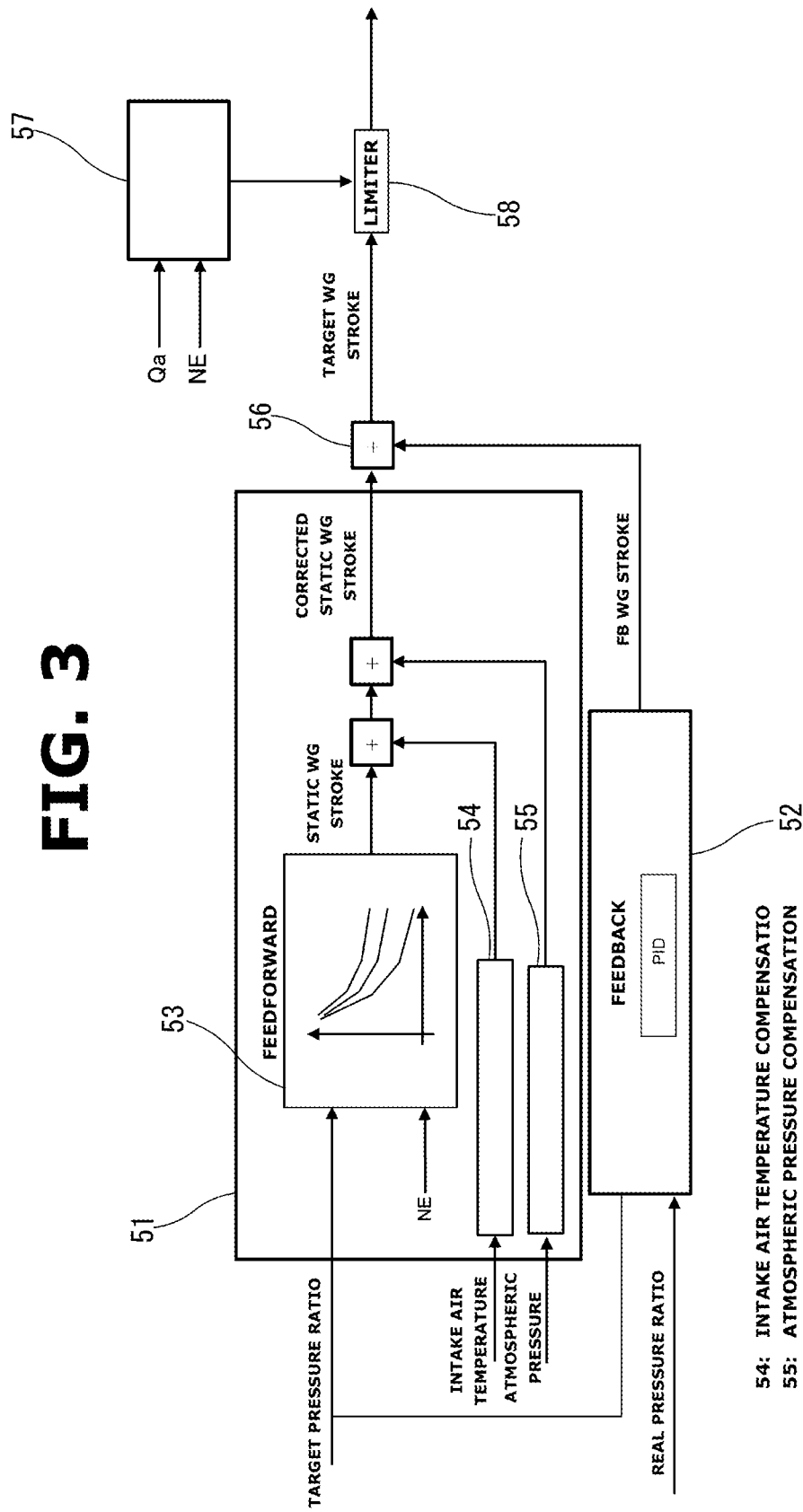
FIG. 3 is a block diagram showing a detailed configuration of a boost pressure control section.

The following describes the opening control of the wastegate valve 24 (in other words, boost pressure control) in the supercharging region, which is performed by the engine controller 10, with reference to functional block diagrams of FIGS. 2 and 3.

FIG. 2 shows an overall configuration of a control system of the wastegate valve 24. The control system mainly includes an engine torque demand (ETD) section 41, a boost pressure control section 42, and a wastegate valve motion control section 43.

The ETD section 41 sets, by a so-called torque demand method, a target torque to be generated by the internal combustion engine 1. The ETD section 41 receives input of the accelerator opening APO sensed by the accelerator opening sensor 33 and the engine rotation speed NE sensed by the crank angle sensor 31, and calculates the required torque based thereon. Then, the ETD section 41 adds a torque component, which is consumed by driving of various auxiliary devices, friction loss, and others, to the required torque, and thereby obtain a target torque to be generated by the internal combustion engine 1. The ETD section 41 further sets a target boost pressure based on the target torque. For example, for a state of acceleration in which the accelerator opening APO changes stepwise, the target boost pressure is a boost pressure to be finally reached. It is to be noted that a pressure on an outlet side of the compressor 12A (absolute pressure) may be simply treated as the "boost pressure", or a ratio in pressure between the inlet side and the outlet side of the compressor 12A (namely, pressure ratio) may be treated as the "boost pressure". In the present embodiment, a pressure ratio between the pressure on the inlet side of the compressor 12A (atmospheric pressure) sensed by the temperature and pressure sensor 19 and the pressure on the outlet side of the compressor 12A sensed by the boost pressure sensor 18 is used as the "boost pressure". Accordingly, the ETD section 41 outputs the target boost pressure in the form of a target pressure ratio.

The boost pressure control section 42 receives input of the target pressure ratio outputted from the ETD section 41 and a real pressure ratio (namely, real boost pressure) based on sensing values of the temperature and pressure sensor 19 and the boost pressure sensor 18, and successively calculates a target wastegate stroke by using a feedforward control and a feedback control in combination as described below, and outputs the target wastegate stroke, thereby causing the real pressure ratio to gradually approach the target pressure ratio. The "wastegate stroke" is a value of stroke of the electric actuator 25 of a linear type that defines the opening of the wastegate valve 24, and is equivalent to the opening of the wastegate valve 24. Accordingly, the target wastegate stroke is equivalent to a target opening of the wastegate valve 24. As the wastegate stroke increases, the opening of the wastegate valve 24 increases, and the quantity of exhaust gas bypassing the turbine 12B increases. Conversely, as the wastegate stroke decreases, the opening of the wastegate valve 24 approaches a fully closed state.

The wastegate valve motion control section 43 controls the stroke of the electric actuator 25 in accordance with the target wastegate stroke. The wastegate valve motion control section 43 receives input of a feedback signal of a real stroke of the electric actuator 25 sensed by a position sensor not shown provided in the electric actuator 25. The wastegate valve motion control section 43 controls the stroke of the electric actuator 25, for example, by a duty control of an electric motor, so as to realize the target wastegate stroke by a feedback control (or a combination of a feedback control and a feedforward control) based on a deviation between the real stroke and the target wastegate stroke. The wastegate valve motion control section 43 corresponds to an "actuator control part" in the claims.

FIG. 3 is a functional block diagram illustrating details of the boost pressure control section 42. The boost pressure control section 42 includes a feedforward control part 51 that calculates a quantity of operation by a feedforward method, and a feedback control part 52 that calculates a quantity of operation by a feedback method. Basically, the feedforward control part 51 corresponds to a "first opening setpoint setting part" in the claims, and the feedback control part 52 corresponds to a "second opening setpoint setting part" in the claims.

The feedforward control part 51 receives input of the target pressure ratio outputted from the ETD section 41 and the engine rotation speed NE, and successively calculates a target wastegate stroke in accordance with the target pressure ratio, wherein the target wastegate stroke corresponds to a "first setpoint of opening". Specifically, the feedforward control part 51 mainly includes a static wastegate stroke calculation part 53 that outputs a static wastegate stroke in accordance with the target pressure ratio and the engine rotation speed NE as parameters, and further includes an intake air temperature correction part 54 that calculates a correction quantity in accordance with the atmospheric temperature inputted, and an atmospheric pressure correction part 55 that calculates a correction quantity in accordance with the atmospheric pressure inputted.

Figure 5:
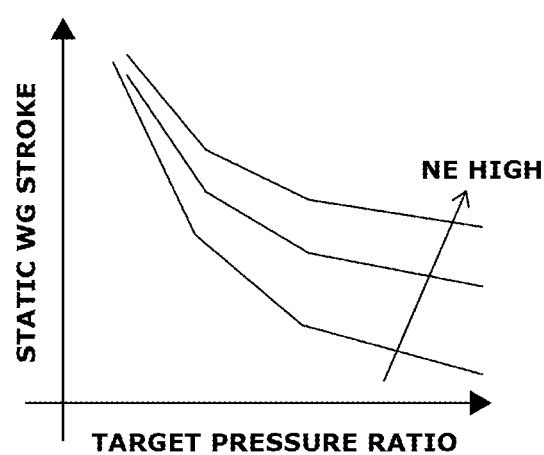
FIG. 5 is a characteristic diagram showing characteristics of a static target wastegate stroke in a feedforward control part.

In this example, the static wastegate stroke calculation part 53 is composed of a map in which a static wastegate stroke is allocated in advance with respect to the target pressure ratio and the engine rotation speed NE as parameters. FIG. 5 is a characteristic diagram schematically showing an example of characteristics of the static wastegate stroke in the static wastegate stroke calculation part 53, in which the static wastegate stroke decreases as the target pressure ratio increases. As the engine rotation speed NE increases, the static wastegate stroke increases. The characteristics of the static wastegate stroke indicate a static relationship between the target pressure ratio and a required opening of the wastegate valve 24. In other words, the relationship corresponds to a relationship between the pressure ratio and the opening of the wastegate valve 24 when the internal combustion engine 1 is in a steady state. With this static wastegate stroke, the rotation speed of the turbocharger 12 does not exceed an allowable rotation speed even when the target pressure ratio is high.

The correction quantities outputted by the intake air temperature correction part 54 and the atmospheric pressure correction part 55 are added respectively to the static wastegate stroke outputted by the static wastegate stroke calculation part 53. This results in a corrected static wastegate stroke. The intake air temperature correction part 54 sets the correction quantity such that the wastegate stroke increases as the atmospheric temperature increases. The atmospheric pressure correction part 55 sets the correction quantity such that the wastegate stroke increases as the atmospheric pressure decreases.

The feedback control part 52 receives input of the target pressure ratio outputted from the ETD section 41 and the real pressure ratio as a feedback signal, and successively calculates a feedback wastegate stroke by a feedback control based on a deviation between the target pressure ratio and the real pressure ratio. The feedback control is implemented by a PID method in this example. The feedback control may be implemented by a method other than the PID method. In order to enhance the response of the boost pressure for a rapid acceleration, the feedback control uses a gain that is set to be relatively high. When the deviation between the target pressure ratio and the real pressure ratio is large, in order to cause the pressure ratio to approach the target pressure ratio in a good response, the feedback wastegate stroke outputted by the feedback control such as PID control serves to reduce the opening of the wastegate valve 24.

The feedback wastegate stroke (namely, feedback control component) outputted by the feedback control part 52 is added at an addition part 56 to the corrected static wastegate stroke (namely, feedforward control component) outputted by the feedforward control part 51, to obtain the target wastegate stroke. As a result, for example, when the deviation between the target pressure ratio and the real pressure ratio is large during rapid acceleration, the target wastegate stroke gets smaller than the corrected static wastegate stroke, namely, the opening of the wastegate valve 24 gets smaller. Although depending on the degree of rapid acceleration and the gain of the feedback control, the opening of the wastegate valve 24 can be fully closed at an initial stage of acceleration in which the target pressure ratio and the real pressure ratio deviate from each other. The relatively small target wastegate stroke in which the feedback wastegate stroke is reflected corresponds to a "second setpoint of opening" in the claims.

When the real pressure ratio gets sufficiently close to the target pressure ratio (in other words, when the real pressure ratio reaches the target pressure ratio), the feedback from the feedback control part 52 is stopped, and the corrected static wastegate stroke generated by the feedforward control part 51 is outputted as the target wastegate stroke. This serves to suppress hunting. The feedforward control and the feedback control may be performed selectively. Namely, the control system may be configured such that when the real pressure ratio deviates from the target pressure ratio, the feedforward control is stopped and the feedback control is performed.

In order to prevent the rotation speed of the turbocharger 12 from excessively increasing during a process of boost pressure increase for rapid acceleration, the boost pressure control section 42 further includes: a limit region determination part 57 that determines whether or not the intake air quantity Qa and the engine rotation speed NE are in a predetermined condition for limitation; and a limiter part 58 that limits the target wastegate stroke to a predetermined limit value when the intake air quantity Qa and the engine rotation speed NE are in the predetermined condition for limitation. As described above, the static wastegate stroke (or the corrected static wastegate stroke) outputted by the feedforward control part 51 is set so as to prevent the rotation speed of the turbocharger 12 (turbine rotation speed) from exceeding the allowable rotation speed. However, with addition of the feedback control component to the static wastegate stroke, the opening of the wastegate valve 24 gets smaller. Accordingly, depending on the condition, the rotation speed of the turbocharger 12 may exceed the allowable rotation speed.

The limit region determination part 57 determines based on the intake air quantity Qa and the engine rotation speed NE whether or not the rotation speed of the turbocharger 12 is likely to exceed the allowable rotation speed. Specifically, when the intake air quantity Qa is larger than or equal to an intake air quantity criterion and the engine rotation speed NE is larger than or equal to an engine rotation speed criterion, it is determined that it is under the condition for limitation. In this example, the intake air quantity criterion and the engine rotation speed criterion are set as indicated by a line L1 in FIG. 6. Specifically, the intake air quantity criterion and the engine rotation speed criterion have characteristics in which as the intake air quantity increases, the engine rotation speed criterion decreases, and as the engine rotation speed increases, the intake air quantity criterion decreases. Accordingly, the condition for limitation is represented by a region on the upper right side of the line L1 in FIG. 6.

In this way, when the intake air quantity Qa and the engine rotation speed NE satisfy the condition for limitation, the limiter part 58 limits the target wastegate stroke in a direction to increase the opening of the wastegate valve 24. The target wastegate stroke after limited by the limiter part 58 corresponds to a "third setpoint of opening" in the claims.

The limitation may be implemented appropriately by addition of a predetermined quantity, or multiplication of a predetermined coefficient, or others. In the present embodiment, the limited target wastegate stroke is set in advance by a table with the engine rotation speed NE as a parameter. By reading and evaluating the limited target wastegate stroke corresponding to the engine rotation speed NE at that time, the limited target wastegate stroke is outputted instead of the target wastegate stroke before the limitation. The target wastegate stroke after limitation is set to increase (namely, the opening of the wastegate valve 24 is set to increase) as the engine rotation speed NE increases.

Figure 6:
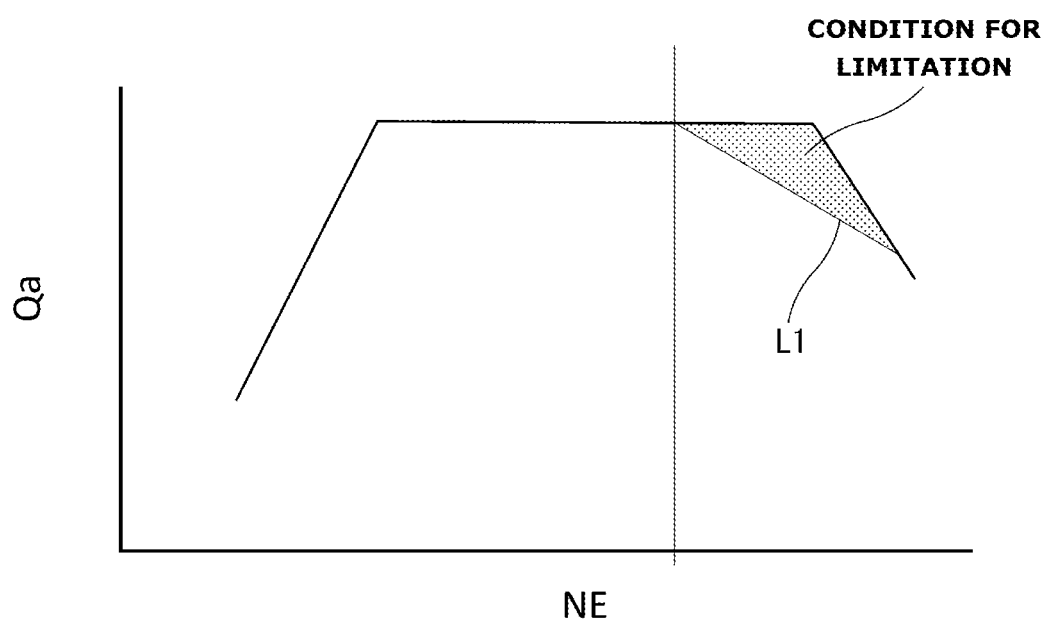
FIG. 6 is a characteristic diagram showing a region of a condition for limitation with respect to an intake air quantity and an engine rotation speed.

Since the rotation speed of the turbocharger 12 is affected by the intake air temperature (atmospheric temperature) and the atmospheric pressure, the intake air quantity criterion and the engine rotation speed criterion, which constitute the condition for limitation, may be corrected depending on the intake air temperature and the atmospheric pressure. With regard to the intake air temperature, the intake air quantity criterion is corrected to decrease as the intake air temperature increases, and the engine rotation speed criterion is corrected to decrease as the intake air temperature increases. Accordingly, as the intake air temperature increases, the line L1 in FIG. 6 is corrected to shift to the lower left, to expand the region for the condition for limitation.

Furthermore, with regard to the atmospheric pressure, the intake air quantity criterion is corrected to decrease as the atmospheric pressure decreases, and the engine rotation speed criterion is corrected to decrease as the atmospheric pressure decreases. Accordingly, as the atmospheric pressure decreases, the line L1 in FIG. 6 is corrected to shift to the lower left, to expand the region for the condition for limitation.

Figure 7:
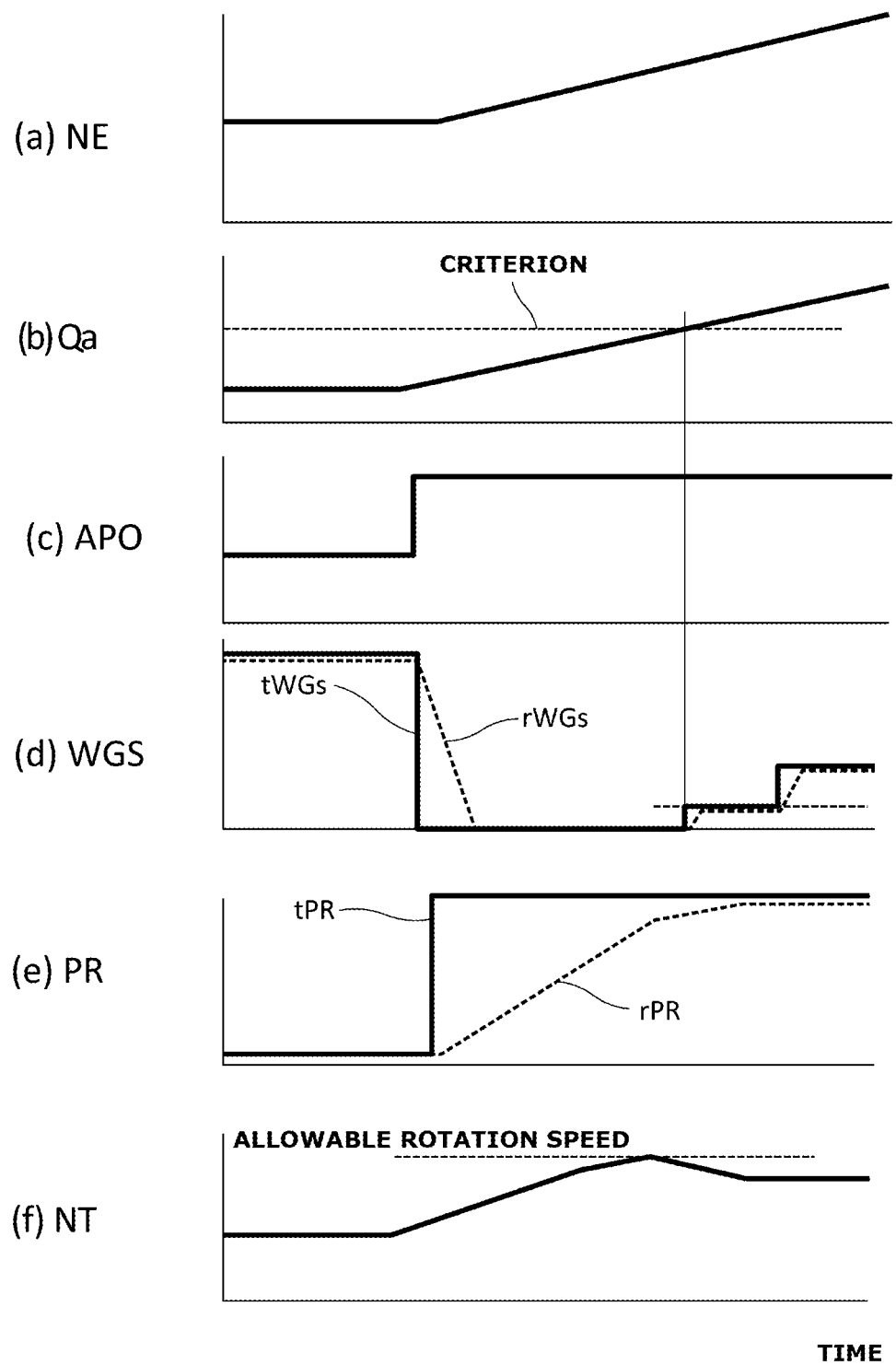
FIG. 7 is a time chart showing an example of changes in a boost pressure and others during acceleration.

The following describes effects produced by the above-described control of the opening of the wastegate valve 24. FIG. 7 is a time chart schematically showing an example of changes in the boost pressure and others during acceleration, and shows (a) the engine rotation speed NE, (b) the intake air quantity Qa, (c) the accelerator opening APO, (d) the wastegate stroke WGS, (e) the pressure ratio PR, and (f) the turbine rotation speed NT (turbocharger rotation speed). In this example of acceleration, the accelerator opening APO changes stepwise to a predetermined value or more when the engine rotation speed NE is relatively high. Based on the change in the accelerator opening APO, the target pressure ratio tPR corresponding to the target torque rapidly increases, and deviates significantly from the real pressure ratio rPR. Accordingly, the feedback control component by the feedback control part 52 described above is set large in the direction to reduce the wastegate stroke WGS. In this example, the target wastegate stroke tWGS is set equivalent to the fully closed state. After a certain delay from the change in the target wastegate stroke tWGS, the real wastegate stroke rWGS changes to be equivalent to the fully closed state, so that the real pressure ratio rPR relatively quickly increases with increase in the turbine rotation speed NT.

In the example of FIG. 7, before the real pressure ratio rPR reaches the target pressure ratio tPR, the intake air quantity Qa exceeds the intake air quantity criterion which constitutes the condition for limitation, and simultaneously, the engine rotation speed NE also exceeds the engine rotation speed criterion although not shown. Accordingly, the target wastegate stroke tWGS is set to the limited target wastegate stroke by the action of the limiter part 58 described above. Namely, the target value is limited in the direction to increase the opening of the wastegate valve 24.

By the limitation of the opening of the wastegate valve 24, the turbine rotation speed NT is suppressed from increasing, and does not exceed the allowable rotation speed, as shown in FIG. 7.

Thereafter, the real pressure ratio rPR reaches (namely, gets sufficiently close to) the target pressure ratio tPR, and the addition of the feedback control component by the feedback control is terminated. Accordingly, thereafter, the target wastegate stroke tWGS is set to the static wastegate stroke by the feedforward control part 51 (corresponding to the "first setpoint of opening" in the claims) is given, and in accordance with this target wastegate stroke tWGS, the real wastegate stroke rWGS is obtained. As described above, the real wastegate stroke rWGS is equivalent to the real value of the opening of the wastegate valve 24.

Figure 4:
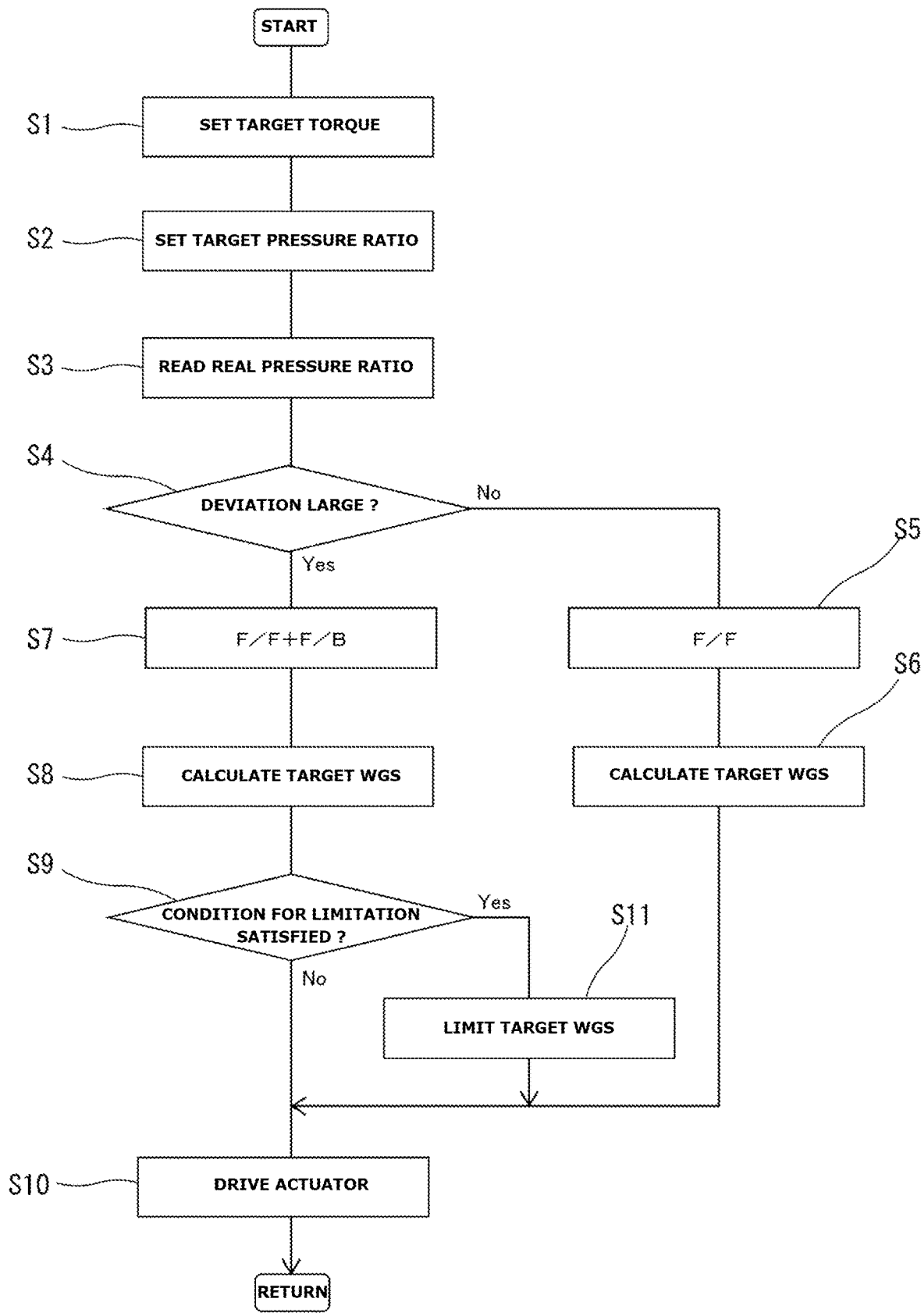
FIG. 4 is a flowchart showing a flow of a process of controlling the opening of the wastegate valve.

FIG. 4 is a flowchart illustrating a flow of a process of wastegate valve opening control. The illustrated routine is repeatedly executed. At Step 1, the target torque to be generated by the internal combustion engine 1 is set mainly based on the accelerator opening APO and the engine rotation speed NE. Then, at Step 2, the target pressure ratio (in other words, target boost pressure) to be reached is set based on the target torque. At Step 3, the real pressure ratio (in other words, the real boost pressure) is read.

Next, at Step 4, it is determined whether or not the difference between the target pressure ratio and the real pressure ratio is large enough to perform feedback control. When it is determined that the difference between the target pressure ratio and the real pressure ratio is smaller than the predetermined value, the process proceeds to Step 5 to select the feedforward control. Then, at Step 6, the target wastegate stroke is calculated based on the static characteristic described above. Furthermore, the process proceeds from Step 6 to Step 10 to drive and control the electric actuator 25 in accordance with the target wastegate stroke.

Therefore, in case of slow acceleration, the opening of the wastegate valve 24 is controlled mainly by the feedforward control, so that there is almost no possibility that the rotation speed of the turbocharger 12 exceeds the allowable rotation speed even when the boost pressure is high.

When it is determined at Step 4 that the difference between the target pressure ratio and the real pressure ratio is larger than the predetermined value, the process proceeds to Step 7 where the feedback control is selected in addition to (or instead of) the feedforward control. Then, at Step 8, the target wastegate stroke is calculated using the feedback control so as to cause the real pressure ratio to quickly approach the target pressure ratio.

Following the calculation of the target wastegate stroke, it is determined at Step 9 whether or not the intake air quantity and the engine rotation speed are within the condition for limitation described above.

When it is determined that the condition for limitation is not satisfied, the process proceeds to Step 10 where the electric actuator 25 is driven and controlled in accordance with the target wastegate stroke obtained by the feedback control. When it is determined that the condition for limitation is satisfied, the process proceeds to Step 11 where the target wastegate stroke is limited as described above. In this example, by using the limit value according to the engine rotation speed, the limited target wastegate stroke is set in the direction to increase the opening of the wastegate valve 24. Then, at Step 10, the electric actuator 25 is driven and controlled similarly.

When the real pressure ratio sufficiently approaches the target pressure ratio by the feedback control, the process proceeds from Step 4 to Steps 5 and 6 where the control is switched to the feedforward control described above.

As described above, in the above embodiment, while the real boost pressure (real pressure ratio) is lower than the target boost pressure (target pressure ratio), the wastegate valve 24 is controlled in accordance with the second setpoint of opening (feedback wastegate stroke), wherein the second setpoint is smaller than the first setpoint of opening (static wastegate stroke) that is the static target value corresponding to the target boost pressure to be reached. This serves to enhance the responsiveness of change in the boost pressure at the time of acceleration and thus enhance the responsiveness of acceleration. Then, when the intake air quantity and the engine rotation speed exceed the criteria, which constitute the condition for limitation, during operation based on the second setpoint of opening, the limitation to the third setpoint of opening (the limited wastegate stroke) larger than the second setpoint of opening (the feedback wastegate stroke) is activated so that the rotation speed of the turbocharger 12 does not exceed the allowable rotation speed.

In particular, the feature that based on the intake air quantity and the engine rotation speed, the rotation speed of the turbocharger 12 is prevented from excessively increasing, serves to make it unnecessary to provide a rotation speed sensor in the turbocharger 12. Even if the turbocharger 12 includes a rotation speed sensor, the provision of the rotation sensor serves a so-called fail-safe function.

Furthermore, the feature that both the intake air quantity and the engine rotation speed are used to constitute the condition for limitation, makes it possible to measure the rotation speed of the turbocharger 12 more accurately, and effectively prevent the rotation speed from excessively increasing. Namely, without unnecessary limitation to the opening of the wastegate valve 24, the response of the boost pressure can be enhanced while the rotation speed of the turbocharger 12 does not exceed the allowable rotation speed.

Although one embodiment of the present invention has been described in detail above, the present invention is not limited to the above embodiment, and various modifications may be made. For example, in the above embodiment, the intake air quantity criterion and the engine rotation speed criterion, which constitute the condition for limitation, are set as indicated by the line L1 in FIG. 6, but the setting of the criteria is not limited thereto. The criteria may be set in an appropriate manner so as to prevent the rotation speed of the turbocharger 12 from excessively increasing. In the above embodiment, while the condition for limitation is satisfied, the opening of the wastegate valve is limited to the third setpoint of opening larger than the second setpoint of opening, but the opening of the wastegate valve may be set to the first setpoint of opening.

The invention claimed is:

1. A boost pressure control method for an internal combustion engine provided with a turbo charger including a wastegate valve, the boost pressure control method comprising:
setting a target boost pressure;
setting a first setpoint of opening of the wastegate valve in accordance with the target boost pressure;
while a difference between the target boost pressure and a real boost pressure is larger than a predetermined value, controlling the opening of the wastegate valve to a second setpoint, wherein the second setpoint is smaller than the first setpoint;
while controlling the opening of the wastegate valve to the second setpoint, determining whether or not a condition for limitation is satisfied in which an intake air quantity is greater than or equal to an intake air quantity criterion and an engine rotation speed is greater than or equal to an engine rotation speed criterion;
in response to a determination that the condition for limitation is satisfied, controlling the opening of the wastegate valve in a direction to increase from the second setpoint; and
setting the intake air quantity criterion and the engine rotation speed criterion such that:
the engine rotation speed criterion decreases as the intake air quantity increases; and
the intake air quantity criterion decreases as the engine rotation speed increases.

2. The boost pressure control method as claimed in claim 1, comprising:
in response to a determination that the condition for limitation is satisfied, controlling the opening of the wastegate valve to a third setpoint, wherein the third setpoint is larger than the second setpoint; and
in response to a condition that the difference between the target boost pressure and the real boost pressure gets smaller than the predetermined value, controlling the opening of the wastegate valve to the first setpoint.

3. The boost pressure control method as claimed in claim 1, comprising setting the target boost pressure in response to a request of acceleration when an accelerator opening changes to be greater than or equal to a predetermined value.

4. The boost pressure control method as claimed in claim 1, comprising setting the second setpoint successively by a feedback control based on the difference between the target boost pressure and the real boost pressure.

5. The boost pressure control method as claimed in claim 1, comprising setting the first setpoint successively by a feedforward control based on a static characteristic defined by the target boost pressure and engine rotation speed as parameters.

6. The boost pressure control method as claimed in claim 2, comprising setting the third setpoint smaller than the first setpoint.

7. The boost pressure control method as claimed in claim 1, comprising correcting the intake air quantity criterion and the engine rotation speed criterion, which define the condition for limitation, in accordance with an intake air temperature such that:
the intake air quantity criterion decreases as the intake air temperature increases; and
the engine rotation speed criterion decreases as the intake air temperature increases.

8. The boost pressure control method as claimed in claim 1, comprising correcting the intake air quantity criterion and the engine rotation speed criterion, which define the condition for limitation, in accordance with an atmospheric pressure such that:
the intake air quantity criterion decreases as the atmospheric pressure decreases; and
the engine rotation speed criterion decreases as the atmospheric pressure decreases.

9. A boost pressure control device for an internal combustion engine, comprising:
a turbo charger including a wastegate valve whose opening is structured to be controlled via an actuator;
a boost pressure sensor structured to sense a real boost pressure;
a target boost pressure setting part configured to set a target boost pressure;

a first opening setpoint setting part configured to set a first setpoint of a target opening of the wastegate valve in accordance with the target boost pressure;

a second opening setpoint setting part configured to set a second setpoint of the target opening while a difference between the target boost pressure and the real boost pressure is larger than a predetermined value, wherein the second setpoint is smaller than the first setpoint;

a limit region determination part configured to determine whether or not a condition for limitation is satisfied in which an intake air quantity is greater than or equal to an intake air quantity criterion and an engine rotation speed is greater than or equal to an engine rotation speed criterion, during operation based on the second setpoint;

a limiter part configured to increase the target opening from the second setpoint for opening control of the wastegate valve, in response to a determination that the condition for limitation is satisfied; and an actuator control part configured to control the actuator in accordance with the target opening;

wherein the intake air quantity criterion and the engine rotation speed criterion are set such that:
  the engine rotation speed criterion decreases as the intake air quantity increases; and
  the intake air quantity criterion decreases as the engine rotation speed increases.

* * * * *